United States Patent
Huang

(10) Patent No.: US 9,003,667 B2
(45) Date of Patent: Apr. 14, 2015

(54) PAIR OF GARDEN SCISSORS WITH AN ADJUSTABLE CUTTING

(71) Applicant: Ho Cheng Garden Tools Co., Ltd., Changhua County (TW)

(72) Inventor: Yao-Chung Huang, Changhua County (TW)

(73) Assignee: Ho Cheng Garden Tools Co., Ltd., Fuxing Township (TW)

(*) Notice: Subject to any disclaimer, the term of this patent is extended or adjusted under 35 U.S.C. 154(b) by 181 days.

(21) Appl. No.: 13/744,793

(22) Filed: Jan. 18, 2013

(65) Prior Publication Data

US 2014/0202007 A1    Jul. 24, 2014

(51) Int. Cl.
*A01G 3/02* (2006.01)
*B26B 13/00* (2006.01)
*B26B 17/00* (2006.01)

(52) U.S. Cl.
CPC ........................................ *A01G 3/02* (2013.01)

(58) Field of Classification Search
USPC .......................................... 30/254, 261, 262
See application file for complete search history.

(56) References Cited

U.S. PATENT DOCUMENTS

| | | | | |
|---|---|---|---|---|
| 3,416,226 A | * | 12/1968 | Pfaffenbach | 30/261 |
| 4,073,059 A | * | 2/1978 | Wallace et al. | 30/261 |
| 4,341,016 A | * | 7/1982 | Harrison et al. | 30/262 |
| 8,079,150 B2 | * | 12/2011 | Huang | 30/254 |
| 8,266,804 B2 | * | 9/2012 | Huang | 30/254 |
| 8,661,691 B2 | * | 3/2014 | Huang | 30/254 |
| 2006/0191142 A1 | * | 8/2006 | Jou | 30/262 |
| 2007/0266568 A1 | * | 11/2007 | Lin | 30/134 |
| 2008/0184567 A1 | * | 8/2008 | Jou | 30/262 |
| 2009/0090010 A1 | * | 4/2009 | Lin | 30/254 |
| 2014/0202007 A1 | * | 7/2014 | Huang | 30/262 |

FOREIGN PATENT DOCUMENTS

GB        2509947    *  7/2014

* cited by examiner

*Primary Examiner* — Hwei C Payer
(74) *Attorney, Agent, or Firm* — Wang Law Firm, Inc.; Li K. Wang; Stephen Hsu

(57) ABSTRACT

A pair of garden scissors with an adjustable cutting angle is provided with first and second scissor members. A positioning protrusion of the first scissor member cooperates with a positioning end of the angle-restricting member of the second scissor member to restrict the maximum cutting angle of the first scissor member, and an adjust member is able to adjust the cutting angle by adjusting the position of the angle-restricting member, so that the cutting angle can be freely adjusted within the movement range of the angle-restricting member.

10 Claims, 8 Drawing Sheets

PAIR OF GARDEN SCISSORS WITH AN ADJUSTABLE CUTTING

BACKGROUND OF THE INVENTION

1. Field of the Invention

The present invention relates to a pair of garden scissors, and more particularly to a pair of garden scissors with an adjustable cutting angle.

2. Description of the Prior Art

A pair of conventional garden scissors 10, as show in FIG. 1, is essentially provided with a first scissor member 11 and a second scissor member 12 which are pivotally connected by a pivot 13. Between the first and second scissor members 11, 12 is disposed a spring 14. The first scissor member 11 is provided with a first positioning groove 111 and a second positioning groove 112, and the second scissor member 12 is formed with an adjust slot 121 and an adjust member 15 disposed in the adjust slot 121. In the adjust slot 121 are formed three engaging recesses 122. Moving the adjust member 15 into different engaging recesses 122 and the first or second positioning groove 111, 112 can lock the first and second scissor members 11, 12 at three different positions, namely, the cutting angle of the garden scissors can be adjusted to three different angles.

This conventional garden scissors 10 can only provide three options in cutting angle adjustment and cannot be adjusted in cutting angle freely, due to the fact that the cutting angle adjustment is still restricted by the positions of the engaging recesses 122 and the first or second positioning groove 111, 112.

The present invention has arisen to mitigate and/or obviate the afore-described disadvantages.

SUMMARY OF THE INVENTION

The primary objective of the present invention is to provide a pair of garden scissors whose cutting angle can be adjusted freely.

To achieve the above objective, a pair of garden scissors with an adjustable cutting angle in accordance with the present invention comprises: a first scissor member and a second scissor member pivotally connected by a pivot assembly and selectively locked with respect to each other by a locking unit.

The first scissor member is formed with a first positioning groove and a positioning protrusion.

The second scissor member pivots with respect to the first positioning groove and is formed with a gap, and the positioning protrusion of the first scissor member extends toward the gap of the second scissor member.

An angle-restricting member is slidably disposed on the second scissor member and provided with a plurality of teeth and a positioning end which extends out of the gap of the second handle, the positioning end cooperates with the positioning protrusion of the first scissor member to restrict a maximum cutting angle of the second scissor member, an adjust member is pivotally disposed on the second handle in such a manner that a helical groove of the helical portion is engaged with the teeth of the angle-restricting member, so that the angle-restricting member is driven to rotate by the helical portion so as to change the maximum cutting angle of the first scissor member.

DETAILED DESCRIPTION OF THE PREFERRED EMBODIMENTS

Figure 1:
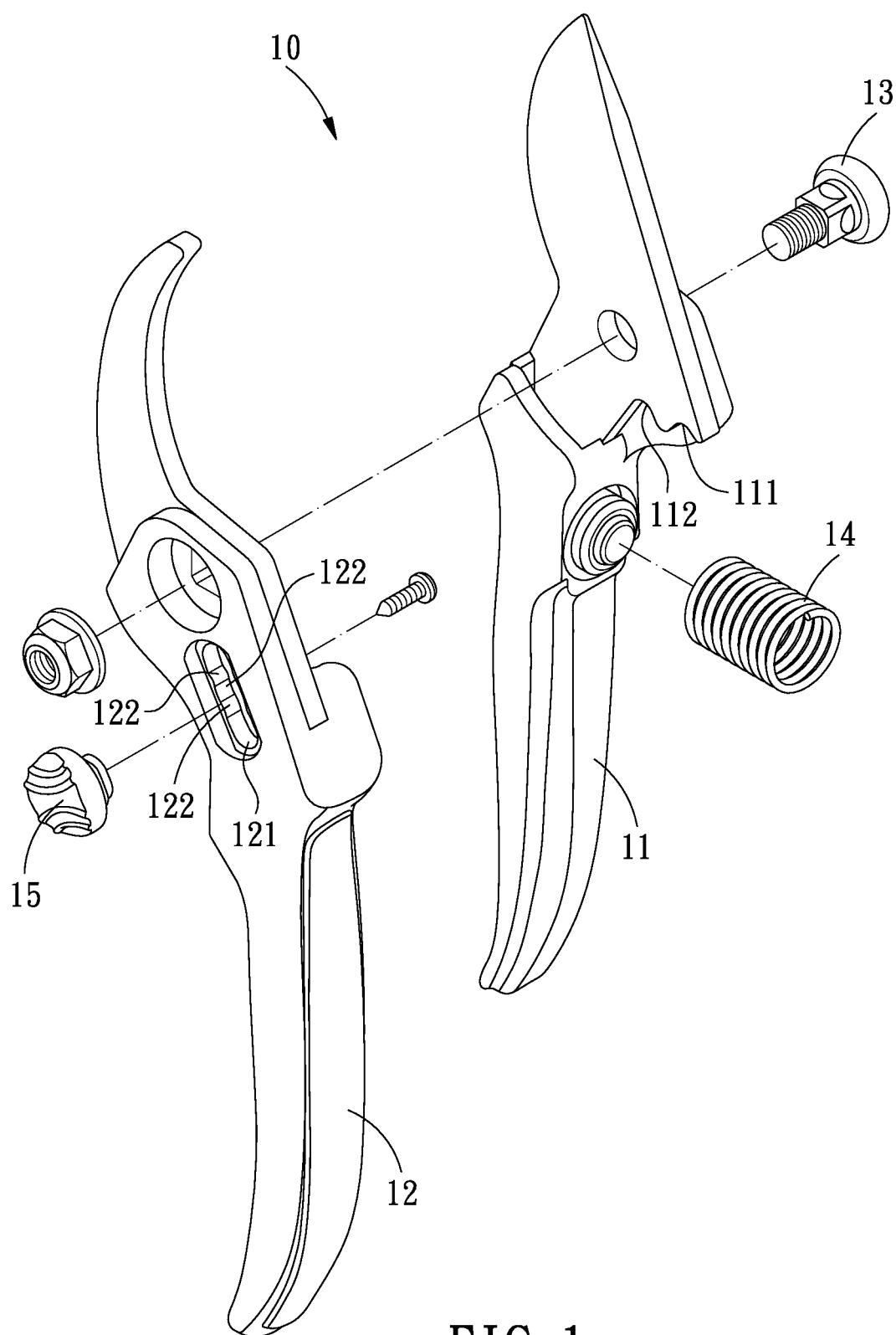
FIG. 1 is an exploded view of a conventional pair of garden scissors.
Figure 2:
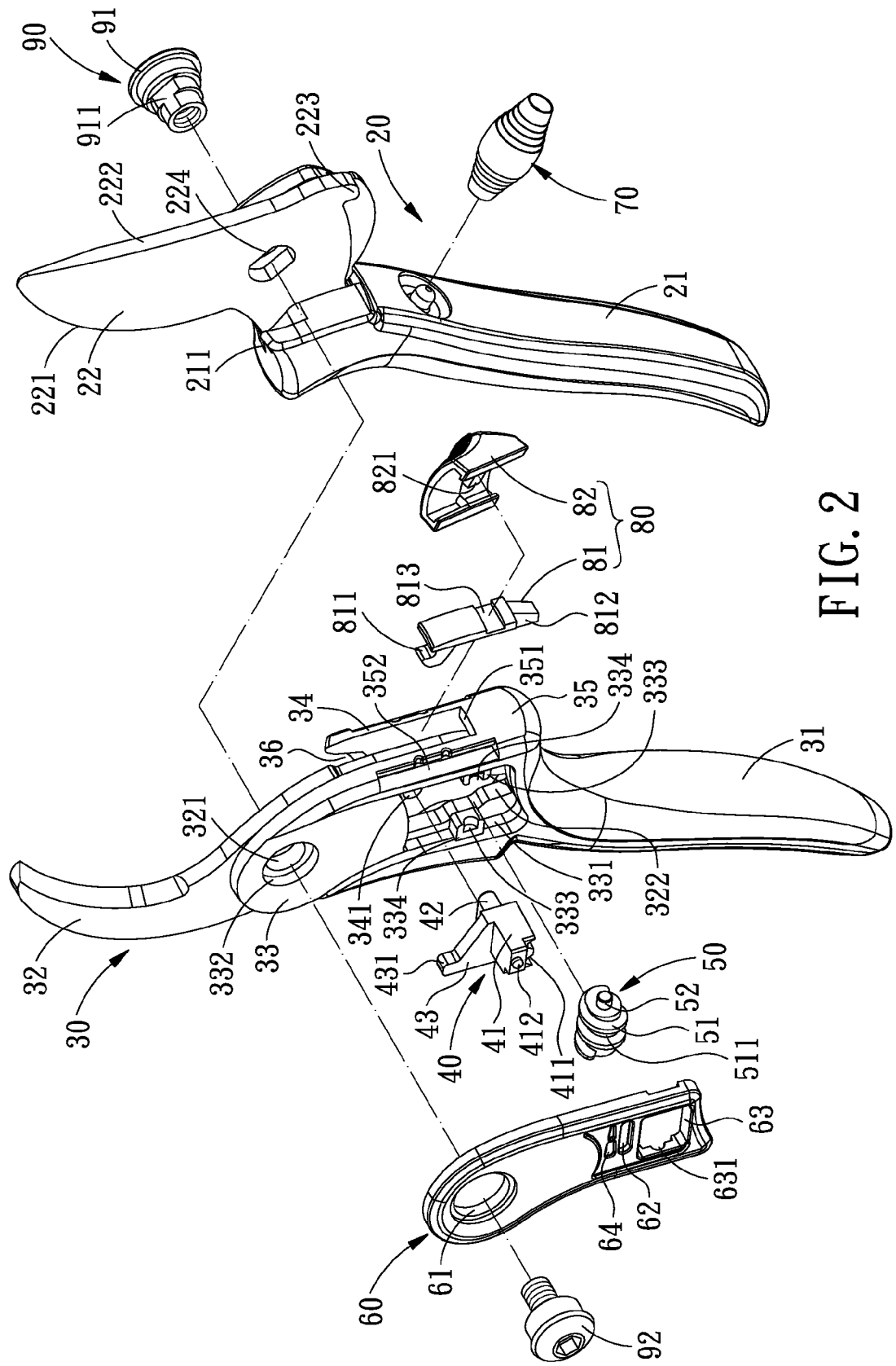
FIG. 2 is an exploded view of a pair of garden scissors with an adjustable cutting angle in accordance with the present invention.

The present invention will be clearer from the following description when viewed together with the accompanying drawings, which show, for purpose of illustrations only, the preferred embodiment in accordance with the present invention.

Referring to FIGS. 2-8, a pair of garden scissors with an adjustable cutting angle in accordance with the present invention comprises a first scissor member 20 and a second scissor member 30 which are pivotally connected by a pivot assembly 90 and are selectively locked with respect to each other by a locking unit 80. The second scissor member 30 is provided with an adjust member 50 and a cover 60, and between the first and second scissor members 20, 30 is further disposed a spring 70.

The first scissor member 20 includes a first handle 21 and a first blade 22. In the first handle 21 is defined a first positioning groove 211. The first blade 22 is a semilunar structure with an arc-shaped cutting edge 221 and a flat-and-straight blunt edge 222. At one end of the blunt edge 222 of the first blade 22 is a positioning protrusion 223, and in the first blade 22 is formed a first slot 224 which is non-circular.

The second scissor member 30 includes a second handle 31 and a second blade 32. The second handle 31 includes a front surface 33, an opposite rear surface 34, and two lateral surfaces 35 connected between one ends of the front and rear surfaces 33, 34. At another ends of the front and rear surfaces 33, 34 is disposed a gap 36. The front surface 33 is formed with a first device hole 331 and a second pivot hole 332. On the inner surface of the first device hole 331 are formed two opposite pivot portions 333 and a pivot groove 334 in each of the pivot portions 333. The rear surface 34 is formed with an elongated groove 341, one of the two lateral surfaces 35 is provided with a second positioning groove 351 and a slide groove 352 which is located at both sides of the second positioning groove 351. The second blade 32 includes a second slot 321 and a second device hole 322. The second blade 32 is fixed at the front surface 33 of the second handle 31 and located between the front and rear surfaces 33, 34. The second scissor member 30 is abutted against the first scissor member 20 in such a manner that the second slot 321 and the second pivot hole 332 are aligned with the first slot 224, and the positioning protrusion 223 of the first scissor member 20 extends toward the gap 36 of the second scissor member 30.

The second scissor member 30 is further provided with an angle-restricting member 40 which includes a drive portion 41 on which being formed a guide block 42 and a positioning block 43. The drive portion 41 is formed with a plurality of teeth 411. One surface of the drive portion 41 is formed an indicating protrusion 412, and another opposite surface of the drive portion 41 is formed the guide block 42. The positioning block 43 includes a positioning end 431. The angle-restricting member 40 is inserted through the first and second device holes 331, 322 of the second handle 31 and the second blade 32 in such a manner that the guide block 42 is slidably inserted in the elongated groove 341 of the rear surface 34, the positioning block 43 is located between the second blade 32 and the rear surface 34, and the positioning end 431 of the angle-restricting member 40 extends out of the gap 36 of the second handle 31, so that the positioning end 431 cooperates with the positioning protrusion 223 of the first scissor member 20 to restrict a maximum cutting angle of the first scissor member 20.

The adjust member 50 includes a helical portion 51 formed with a helical groove 511 and a pin 52 formed at both ends of the helical portion 51. The pins 52 of the adjust member 50 are pivotally disposed in the pivot grooves 334 of the pivot portions 333 of the second handle 31, and the adjust member 50 is pivotally disposed in the first device hole 331 of the second handle 31 in such a manner that the helical groove 511 of the helical portion 51 is engaged with the teeth 411 of the angle-restricting member 40, so that the angle-restricting member 40 can be driven to rotate by the helical portion 51 so as to change the maximum cutting angle of the first scissor member 20.

The cover 60 includes a pivot hole 61, an indicating hole 62 and an operating hole 63. On the cover 60 adjacent to the indicating hole 62 is arranged an indicator 64 for indicating the cutting angle (such as the amount of the degrees of the angle). On the inner surface of the operating hole 63 are formed two positioning concaves 631. The cover 60 is mounted on and covers the second handle 31 in such a manner that the operating hole 63 and the indicating hole 62 are aligned with the adjust member 50 and the angle-restricting member 40, respectively, the pivot hole 61 is aligned with the second pivot hole 332 of the second handle 31 and the second slot 321 of the second blade 32, the indicating protrusion 412 of the angle-restricting member 40 extends out of the indicating hole 62, the two pins 52 of the adjust member 50 are held in the two positioning concaves 631 of the operating hole 63, and the helical portion 51 of the adjust member 50 is exposed out of the operating hole 63.

The spring 70 has two ends connected to the first handle 21 of the first scissor member 20 and the second handle 31 of the second scissor member 30.

The locking unit 80 includes a locking member 81 and a drive member 82. The locking member 81 has a hook portion 811 formed at one end and a positioning portion 812 at the other, and an engaging groove 813 formed between the hook portion 811 and the positioning portion 812. The drive member 82 includes an engaging protrusion 821. The locking member 81 is slidably disposed in the second positioning groove 351 of the second handle 31 in such a manner that the hook portion 811 extends toward to the gap 36, and the positioning portion 812 keeps abutting against the lateral surfaces 35 of the second handle 31 in normal conditions. The drive member 82 is slidably engaged in the slide groove 352 of the second handle 31 in such a manner that the engaging protrusion 821 of the drive member 82 is engaged in the engaging groove 813 of the locking member 81 to drive the locking member 81 to slide. When the hook portion 811 extends out of the gap 36, it can be engaged with the positioning protrusion 223 of the first scissor member 20, bringing the first scissor member 20 into a locked position with respect to the second scissor member 30.

The pivot assembly 90 includes a first pivot member 91 and a second pivot member 92. The first pivot member 91 has a flat portion 911 which is inserted through the first slot 224 of the first scissor member 20 and the second slot 321 and pivot hole 332 of the second scissor member 30 and finally extends out of the pivot hole 61 of the cover 60. The second pivot member 92 is screwed with the first pivot member 91 extending out of the cover 60, and the second blade 32 of the second scissor member 30 is aligned with and rotatable with respect to the first positioning groove 211 of the first handle 21.

Figure 3:
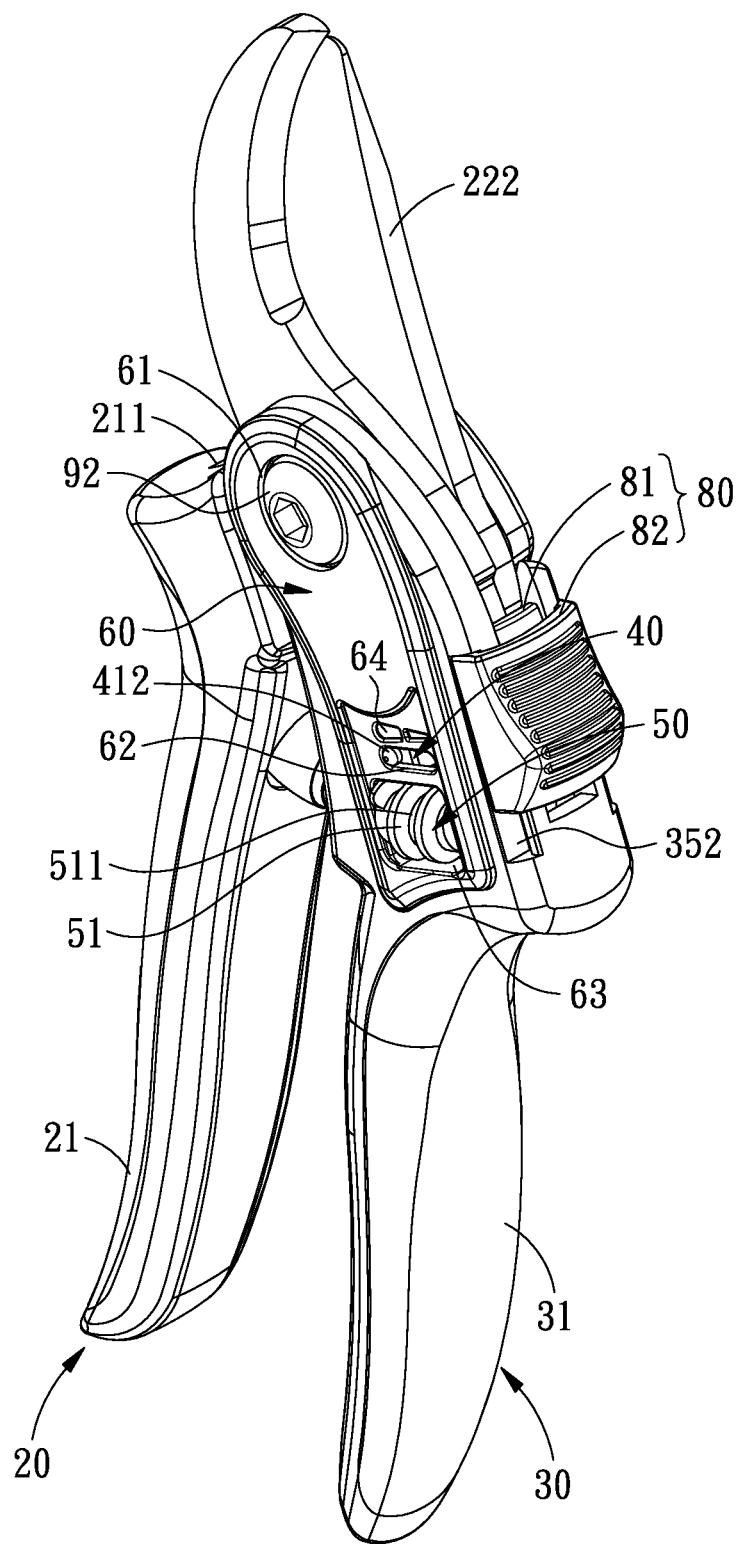
FIG. 3 is a perspective view of the pair of garden scissors with an adjustable cutting angle in accordance with the present invention.
Figure 4:
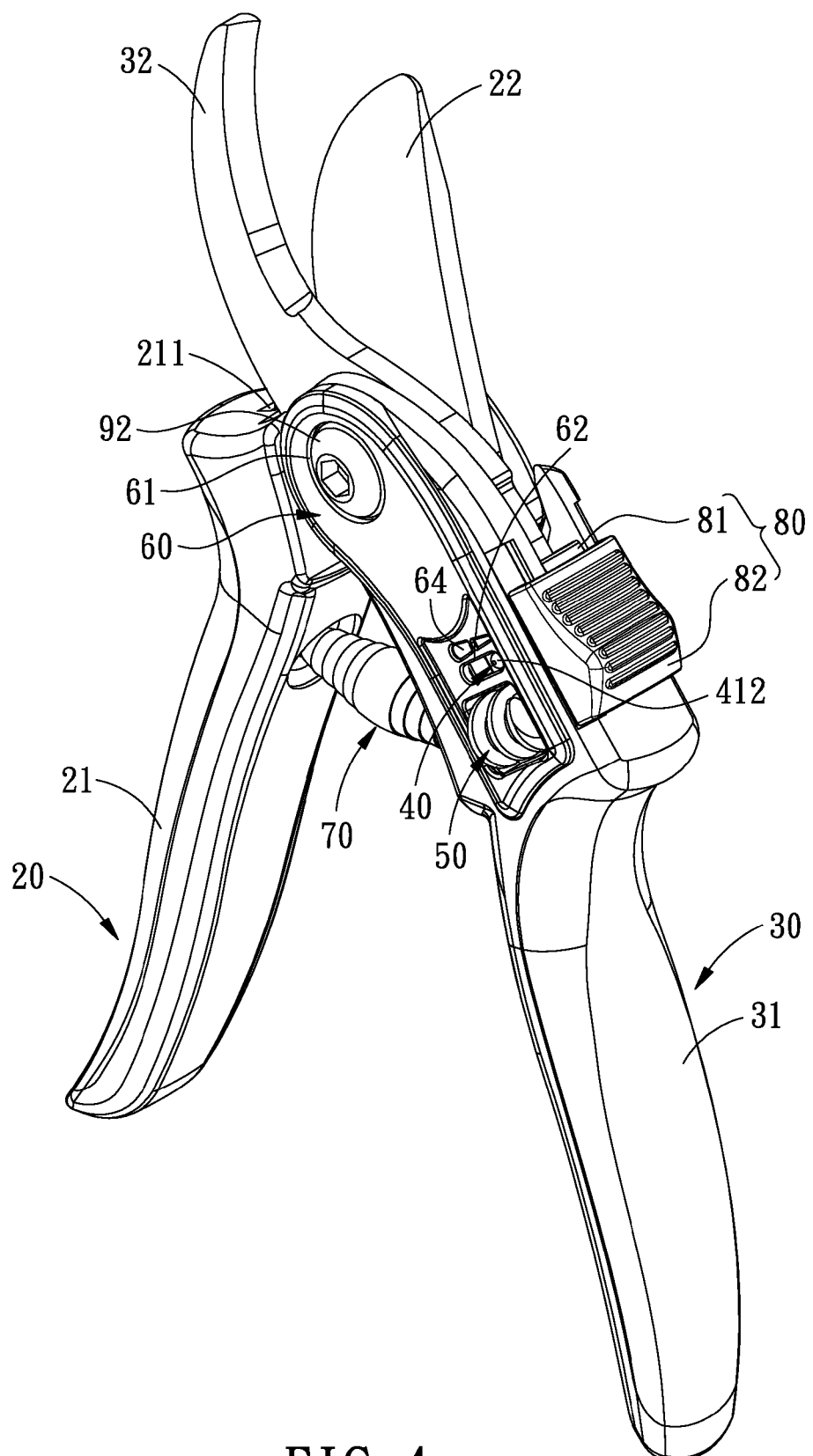
FIG. 4 is an illustrative view showing that the pair of garden scissors with an adjustable cutting angle in accordance with the present invention is opened.
Figure 5:
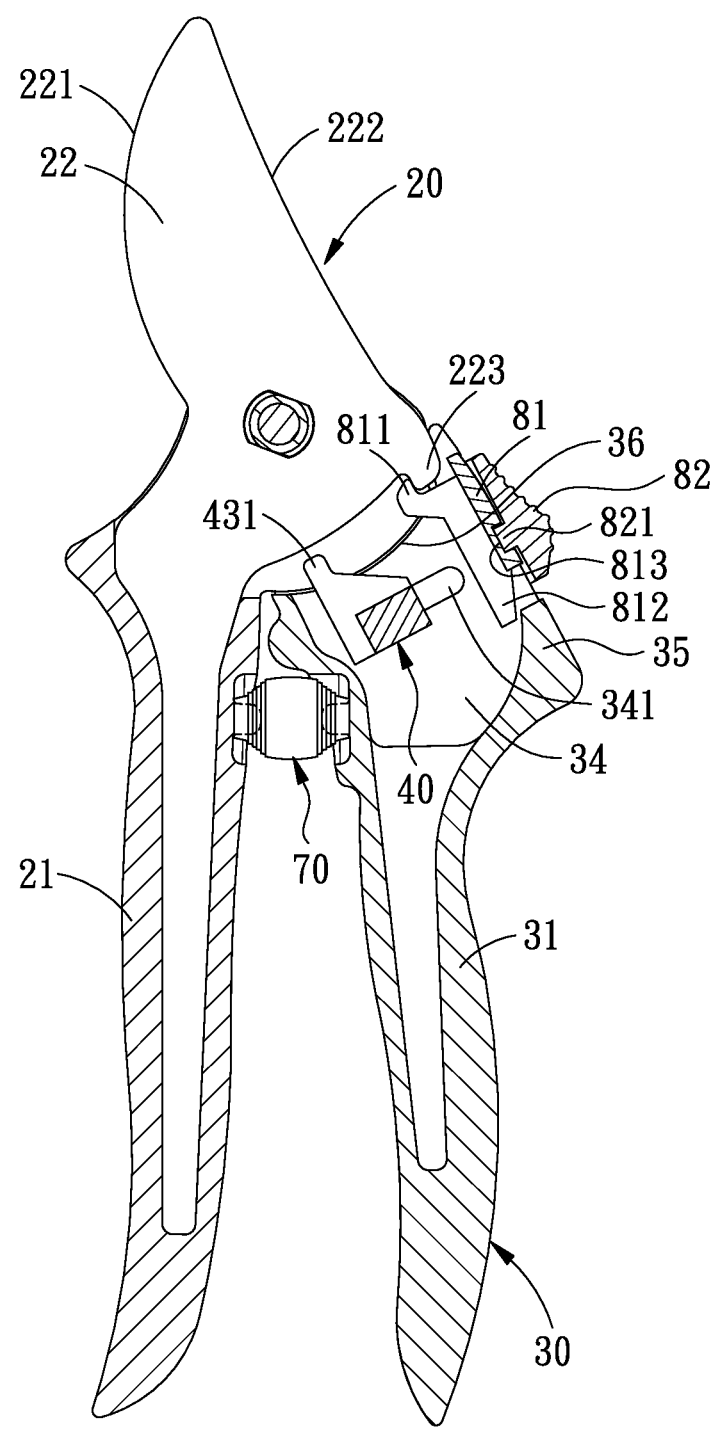
FIG. 5 is a cross sectional view showing that the pair of garden scissors with an adjustable cutting angle in accordance with the present invention is locked in a non-use position.
Figure 6:
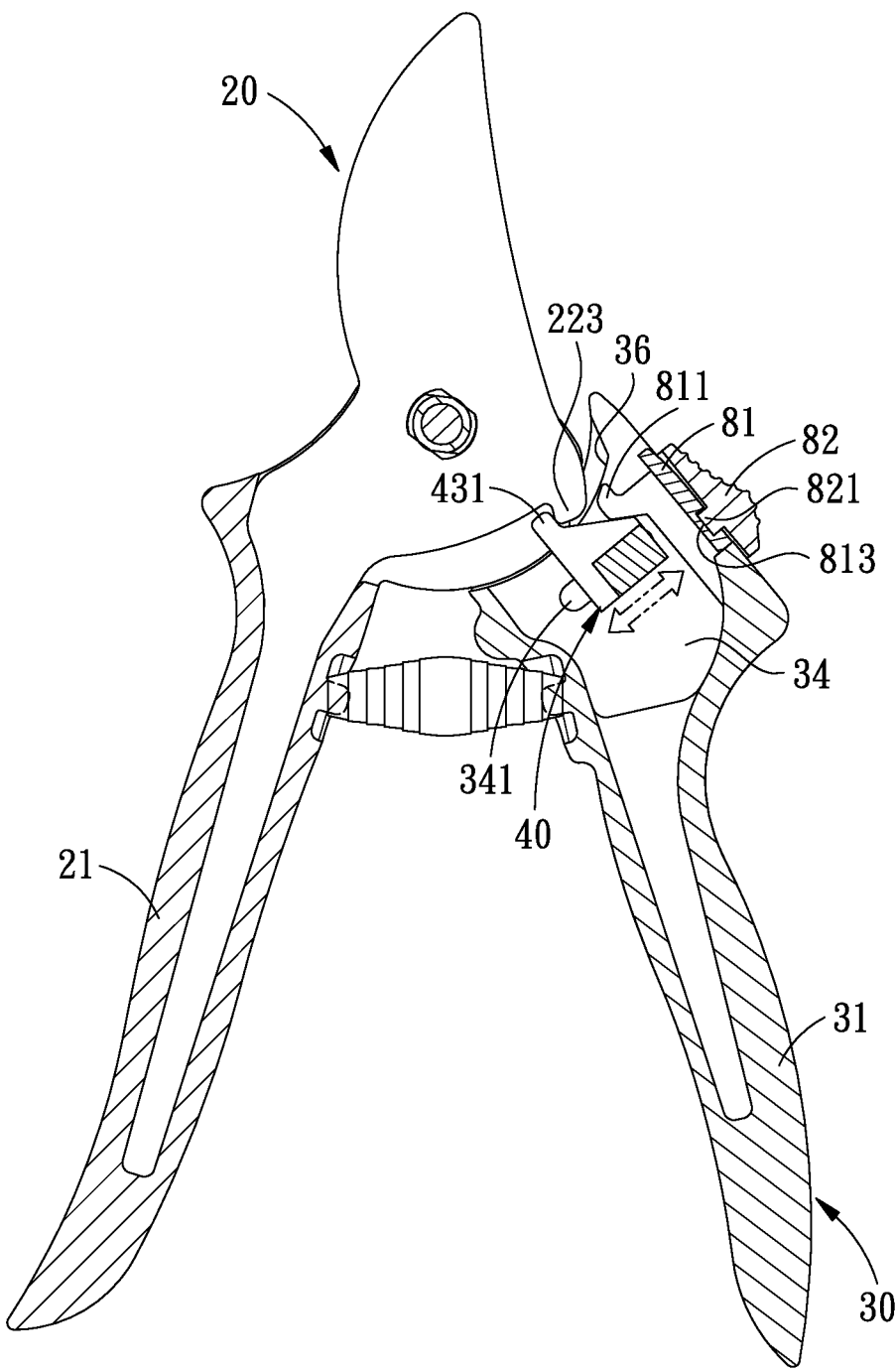
FIG. 6 is a cross sectional view showing that the pair of garden scissors with an adjustable cutting angle in accordance with the present invention is opened.
Figure 7:
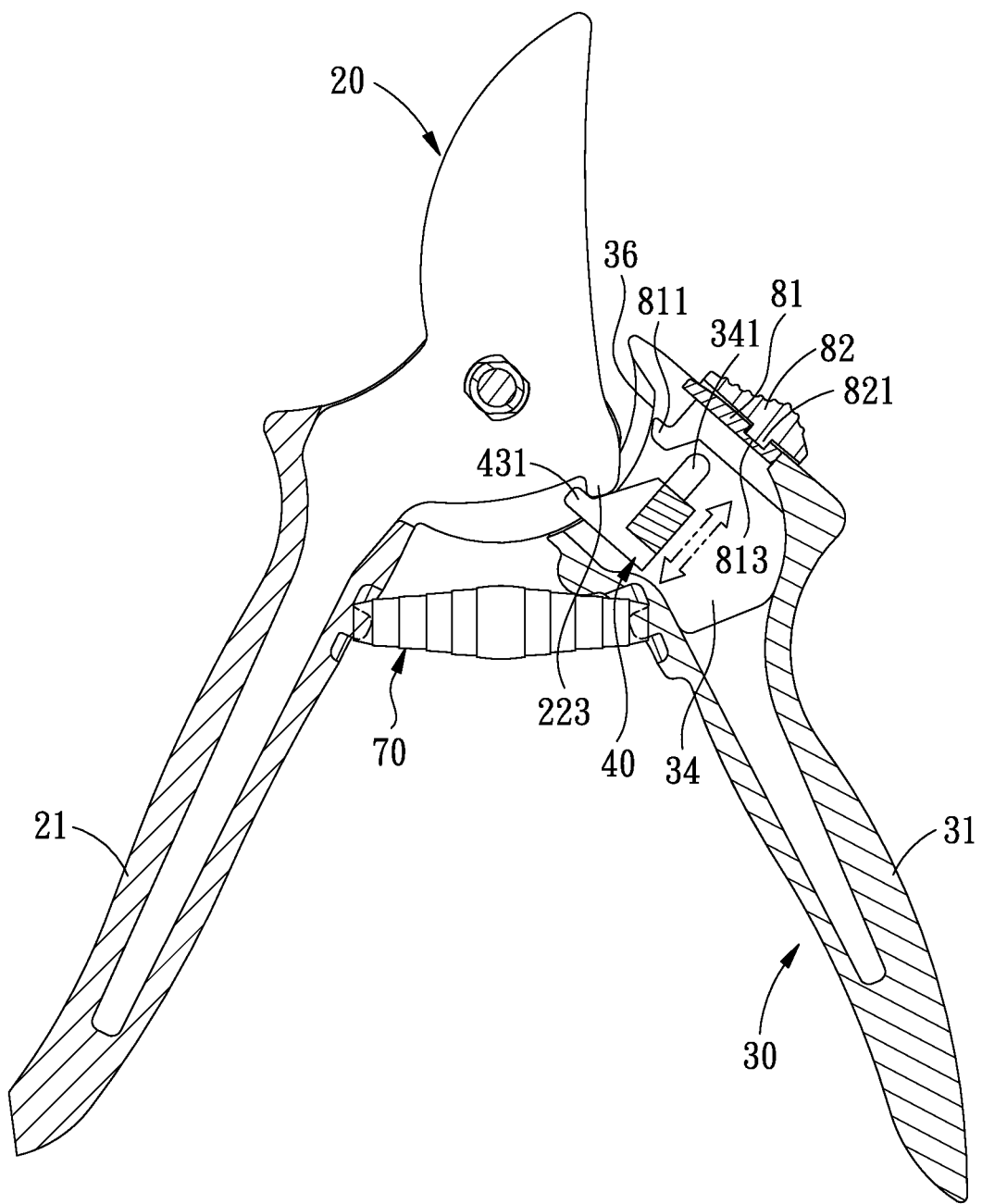
FIG. 7 is a cross sectional view showing that the pair of garden scissors with an adjustable cutting angle in accordance with the present invention is being adjusted to adjust the cutting angle.

The abovementioned are the relations of the main parts of the garden scissors with an adjustable cutting angle in accordance with the present invention, and the operation and locking state of the garden scissors of the present invention are as shown in FIGS. 3 and 4. FIG. 3 shows that the pair of garden scissors of the present invention is locked into a locked position when not in use. To lock the first and second scissor members 20, 30, the user has to press the first and second scissor members 20, 30, so that the spring 70 is compressed to make the first and second scissor members 20, 30 approach each other, and the first scissor member 20 is rotated to a position where the positioning protrusion 223 is aligned with the locking member 81 of the locking unit 80.

Then, the drive member 82 of the locking unit 80 is pulled to drive the locking member 81 to move upward since the engaging protrusion 821 of the drive member 82 engaged with the engaging groove 813 of the locking member 81. When the locking member 81 moves upward, the hook portion 811 of the locking member 81 will extends out of the gap 36 of the second scissor member 30 and engage with the positioning protrusion 223 of the first scissor member 20, so that the first scissor member 20 is restricted from rotation by the positioning protrusion 223.

To use the garden scissors, it only needs to move the locking member 81 downward by pulling the drive member 82. When the locking member 81 moves downward to a position where the locking member 81 is disengaged from the positioning protrusion 223 of the first scissor member 20, the first scissor member 20 will be free to rotate. Under this circumstance, since the positioning end 431 of the angle-restricting member 40 extends out of the gap 36, the first scissor member 20 is still restricted by the positioning end 431, so that, when the first scissor member 20 pivots to the position where the positioning protrusion 223 is abutted against the positioning end 431, the garden scissors of the present invention have been opened to the maximum cutting angle.

To adjust the cutting angle between the first and second scissor members 20, 30, it only needs to rotate the adjust member 50 exposed out of the operating hole 63 of the cover 60, the helical groove 511 of the helical portion 51 of the adjust member 50 will move the teeth 411, the teeth 411 will consequently move the angle-restricting member 40, so that the angle-restricting member 40 will move linearly under the guide of the elongated groove 341 of the rear surface 34 of the second scissor member 30, causing position changes. When the angle-restricting member 40 moves, the positioning end 431 of the angle-restricting member 40 will push the positioning protrusion 223 of the first scissor member 20 to move, changing the maximum cutting angle of the first scissor member 20.

Figure 8:
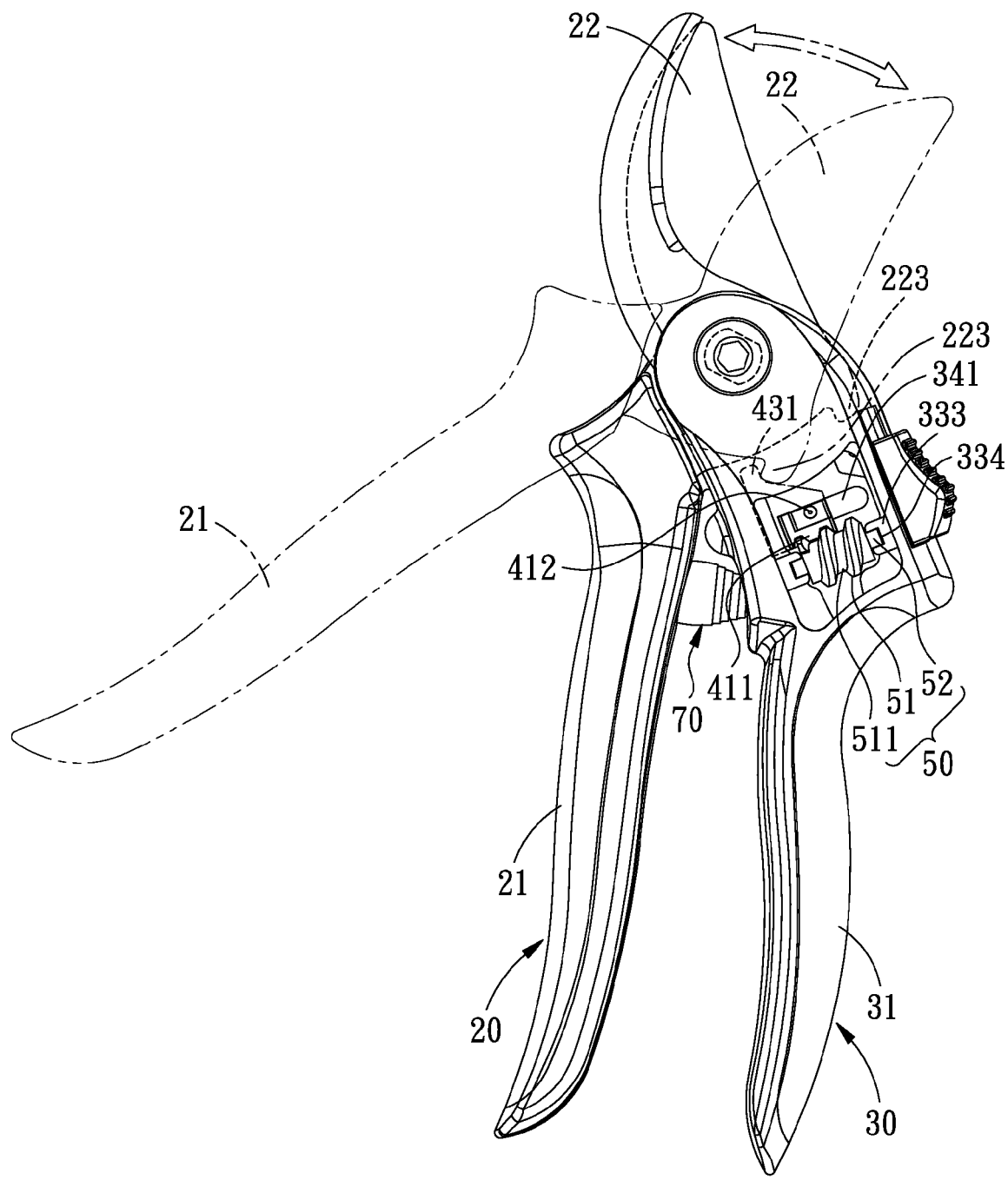
FIG. 8 is another illustrative view of the pair of garden scissors with an adjustable cutting angle in accordance with the present invention.

It is learned from the above description that the maximum cutting angle of the first scissor member 20 can be changed by the cooperation of the angle-restricting member 40 with the adjust member 50, and can be freely adjusted within the movement range of the angle-restricting member 40, as shown in FIG. 8. Once the cutting angle is adjusted to a desired position, it can be fixed by the locking unit 80.

While we have shown and described various embodiments in accordance with the present invention, it is clear to those skilled in the art that further embodiments may be made without departing from the scope of the present invention.

What is claimed is:

1. A pair of garden scissors with an adjustable cutting angle comprising:
   a first scissor member and a second scissor member pivotally connected by a pivot assembly and selectively locked with respect to each other by a locking unit;
   wherein
   the first scissor member is formed with a first positioning groove and a positioning protrusion;
   the second scissor member pivots with respect to the first positioning groove and is formed with a gap, and the positioning protrusion of the first scissor member extends toward the gap of the second scissor member;
   an angle-restricting member is slidably disposed on the second scissor member and provided with a plurality of teeth and a positioning end which extends out of the gap of the second scissor member, the positioning end cooperates with the positioning protrusion of the first scissor member to restrict a maximum cutting angle of the first scissor member, an adjust member is pivotally disposed on the second scissor member in such a manner that a helical groove of a helical portion of the adjust member is engaged with the teeth of the angle-restricting member, so that the angle-restricting member is driven to rotate by the helical portion so as to change the maximum cutting angle of the first scissor member.

2. The pair of garden scissors with an adjustable cutting angle as claimed in claim 1, wherein the first scissor member includes a first handle and a first blade, in the first handle is defined the first positioning groove, the first blade is a semi-lunar structure with an arc-shaped cutting edge and a flat-and-straight blunt edge, the positioning protrusion is located at one end of the blunt edge of the first blade.

3. The pair of garden scissors with an adjustable cutting angle as claimed in claim 1, wherein the second scissor member includes a second handle and a second blade, the second handle includes a front surface, an opposite rear surface, and two lateral surfaces connected between one ends of the front and rear surfaces, at another ends of the front and rear surfaces is disposed the gap, the second blade includes a second device hole, the second blade is fixed at the front surface of the second handle and located between the front and rear surfaces, the front surface is formed with a first device hole, and the adjust member is pivotally disposed in the first device hole of the second handle.

4. The pair of garden scissors with an adjustable cutting angle as claimed in claim 3, wherein the rear surface is formed with an elongated groove, the angle-restricting member includes a drive portion on which being formed a guide block and a positioning block, one surface of the drive portion is formed with the plurality of teeth, and another opposite surface of the drive portion is formed the guide block, the positioning block includes a positioning end, the angle-restricting member is inserted through the first and second device holes of the second handle and the second blade in such a manner that the guide block is slidably inserted in the elongated groove of the rear surface, and the positioning block is located between the second blade and the rear surface.

5. The pair of garden scissors with an adjustable cutting angle as claimed in claim 3, wherein the adjust member includes the helical portion and a pin formed at both ends of the helical portion, on the inner surface of the first device hole of the second handle are formed two opposite pivot portions and a pivot groove in each of the pivot portions, and the pins of the adjust member are pivotally disposed in the pivot grooves of the pivot portions of the second handle.

6. The pair of garden scissors with an adjustable cutting angle as claimed in claim 1, wherein the first scissor member includes a first handle and a first blade, the second scissor member includes a second handle and a second blade, and a spring has two ends connected to the first handle of the first scissor member and the second handle of the second scissor member.

7. The pair of garden scissors with an adjustable cutting angle as claimed in claim 3, wherein the first and second scissor members are selectively locked by the locking unit, one of the two lateral surfaces is provided with a second positioning groove, a locking member of the locking unit has a hook portion formed at one end thereof and a positioning portion at another end and is slidably disposed in the second positioning groove of the second handle in such a manner that the hook portion extends toward to the gap, and the positioning portion keeps abutting against the lateral surfaces of the second handle in normal conditions, when the hook portion extends out of the gap, it will be engaged with the positioning protrusion of the first scissor member, bringing the first scissor member into a locked position with respect to the second scissor member.

8. The pair of garden scissors with an adjustable cutting angle as claimed in claim 7, wherein the locking member has an engaging groove for engaging with a drive member which includes an engaging protrusion, the drive member is slidably engaged in a slide groove of the second handle in such a manner that the engaging protrusion of the drive member is engaged in the engaging groove of the locking member to drive the locking member to slide.

9. The pair of garden scissors with an adjustable cutting angle as claimed in claim 5, wherein a cover is mounted on and covers the second handle and includes an indicating hole and an operating hole which are aligned with the adjust member and the angle-restricting member, respectively, on an inner surface of the operating hole are formed two positioning concaves, the two pins of the adjust member are held in the two positioning concaves of the operating hole, and the helical portion of the adjust member is exposed out of the operating hole, one surface of the angle-restricting member is formed an indicating protrusion which extends out of the indicating hole, and on the cover adjacent to the indicating hole is arranged an indicator for indicating the degree of the cutting angle.

10. The pair of garden scissors with an adjustable cutting angle as claimed in claim 9, wherein the first scissor member includes a first handle and a first blade, the second scissor member includes a second handle and a second blade, the first blade is formed with a first slot which is non-circular, the second handle includes a second pivot hole, the second blade includes a second slot, the cover is formed with a pivot hole, the first and second slots, the second pivot hole of the second handle and the pivot hole of the cover are aligned and connected by the pivot assembly which includes a first pivot member and a second pivot member, the first pivot member has a flat portion which is inserted through the first slot of the first scissor member and the second slot and the second pivot hole of the second scissor member and finally extends out of the pivot hole of the cover, and the second pivot member is screwed with the first pivot member extending out of the cover.

\* \* \* \* \*